July 27, 1954  J. DE GIER ET AL  2,684,557

METHOD FOR SEALING VITREOUS ELECTRICAL DISCHARGE DEVICES

Filed March 4, 1952

INVENTORS
Johannes de Gier
Johannes Cornelis Janssen
By
Agent

Patented July 27, 1954

2,684,557

UNITED STATES PATENT OFFICE 2,684,557

METHOD FOR SEALING VITREOUS ELECTRICAL DISCHARGE DEVICES

Johannes de Gier and Johannes Cornelis Janssen, Eindhoven, Netherlands, assignors to Hartford National Bank and Trust Company, Hartford, Conn., as trustee Application March 4, 1952, Serial No. 274,764

Claims priority, application Netherlands March 17, 1951

4 Claims. (Cl. 49—82)

This invention relates to a method for sealing vitreous electrical discharge devices, more particularly, the invention relates to a method for sealing a generally rectangularly-shaped glass window to a correspondingly shaped end of a cone of a cathode-ray tube.

For cathode-ray tubes, more particularly television picture tubes, a generally rectangular glass window is used which must frequently be sealed to a glass cone, which is, at least at one end, also generally rectangular in shape. However, a difficulty is entailed with the use of a conventional sealing machine for such a purpose in that the distance between the edges of the rectangular window and the burners of the sealing machine, which are usually fixed, is not constant. The corners of a rotating rectangular window and cone move past the fixed burners at a shorter distance than the edges of the rectangle. Furthermore, the speed with which the various parts of the rectangle move in their circle of rotation is not uniform; the corner zones, being further from the center, have higher speed and, consequently, move more quickly past the burners and are more rapidly cooled by the passing flow of air than the edges of the rectangle. Consequently, the corners become cooler than the edges, so that the sealing of such a window to such a cone cannot, in practice, be carried out with the use of a conventional sealing machine for tubes having a circular window.

An object of the invention is a method for sealing a generally rectangularly-shaped glass window to the correspondingly shaped end of a cone of a cathode-ray tube.

A further object of the invention is a method for sealing a generally rectangularly-shaped glass window to the correspondingly shaped end of a cone of a cathode-ray tube utilizing stationary burners or groups of burners arranged in a manner such that the entire sealing area is heated to a substantially uniform temperature.

These and further objects of the invention will appear from the description that follows.

In accordance with the invention, one or more burners or groups of burners are directed at the sealing area or abutting portions of a window and cone in a manner such that, as the cone and the window rotate together, the sealing area or abutting portions of the window and cones are brushed throughout its length by the flames of these burners, while one or more burners or groups of burners are directed tangentially or at a small angle to the circle of rotation of the corners of the abutting cone and window so that only the corners and their adjacent portions are heated; the combined heat of the burners and/or groups of burners assuring that the entire sealing area is heated to a uniform temperature.

Furthermore, according to the invention, the flames of the burners or groups of burners are arranged so that those portions of the cone and window which pass slower through the flames of the fixed burners pass through a portion of the flame of the burner which is cooler than the hottest portion so that less heat is transferred for the longer period of time involved. Those portions of the cone and window which pass quickly through the flames of the fixed burner being further from the center of rotation and, accordingly, having a greater angular velocity pass through the hottest zone of the burners so that more heat is transferred thereto for the shorter period of time. Accordingly, all portions of the sealing area are heated to substantially the same temperature.

The invention will now be described with reference to the accompanying drawing wherein.

Figure 1:
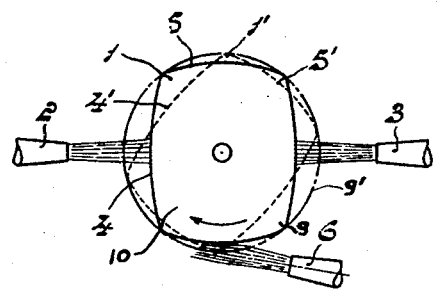
Fig. 1 shows one method according to the invention for sealing a rectangular glass window to a rectangular cone of a cathode-ray tube.

Referring to Fig. 1, 10 designates a generally-rectangularly shaped glass window abutting and in front of a correspondingly shaped end of a cone of a cathode-ray tube, such as a television picture tube, and having sealing edges 1 by which such glass window may be sealed to such tube.

In the specific form shown, the glass window 10 together with the cathode-ray tube are arranged to be rotated in a clockwise direction, as shown by the arrow in Fig. 1, around a central axis. Two facing burners 2, 3 are positioned on opposite sides, respectively, of the window 10 and are arranged so that the flames therefrom are directed at the sealing edges 1 of the window 10.

The burners are adjusted in a manner such that the longest rectangle edges 4 of the window 10, being closer to the center of rotation, pass exactly outside the hottest part of the flames 2, 3, while the short rectangle sides 5, being further from the center of rotation, pass through the hottest part of these flames. The long rectangle sides 4 move more slowly past the burners 2, 3 than the short rectangle sides 5, but owing to the aforesaid adjustment of the burners 2, 3 all the sides are heated substantially to the same temperature.

This adjustment can be made, in the case of gas burners, for instance, by merely suitably spacing the burner from the window 10 and by controlling the length of the flame itself. Most gas flames have a blue-white cone shaped center portion, the tip of which constitutes the hottest part of the flame. The flame can be adjusted so that the tip of the blue-white center portion touches the short rectangle sides 5 of the rectangular window 10 when it is rotated to a position opposite to the burners, 2, 3; consequently, the long rectangle sides 4 being closer to the center of rotation will be separated by a small distance therefrom when they are rotated to a position opposite to the burners 2, 3.

Since the corners 9 of the window 10 move too rapidly past the burners 2, 3 since they are furthest from the center of rotation, and are cooled by the passing flow air more rapidly than the sides 4, 5, an additional burner 6 is provided to heat the corners 9. The additional burner 6 is positioned at a small angle to the tangent of the circle path of the corners 9 shown as the dash-dot circle 9' which intercepts the four corners 9 and thus contacts only the corners 9 and the immediate adjacent area surrounding each corner 9, as is evident from the rotated position of the window 10 and cone shown in dotted lines and designated as 1'. The rectangular sides 4, 5 of the window 10 are not touched by the flame of this additional burner 6. The flame and location of this burner 6 can be adjusted so that the corners 9 are heated to substantially the same temperature as the rectangular sides 4, 5 and that the heat from the burner 6 contributes practically nothing to the heating of the sides 4, 5. With such an arrangement, one can obtain a very uniform temperature throughout the sealing edges so that the edges of the window and the cone melt uniformly together throughout their circumference. With this method it is even possible, without the need for further means, to seal a cone and a window of a kind of glass which is worked only with difficulty, for example, lime glass (glass free from lead).

Figure 2:
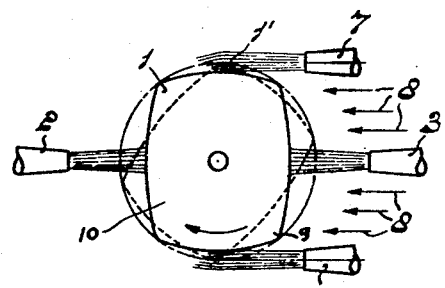
Fig. 2 shows modifications of the method shown in Fig. 1 for sealing a rectangular glass window to a rectangular cone of a cathode-ray tube.

Fig. 2 illustrates other modifications of the method shown in Fig. 1 for sealing a rectangular window to the cone of a cathode-ray tube. For example, a second additional burner 7 may be provided, whose function is the same as the function of the additional burner 6 described in connection with Fig. 1. By arranging this second additional burner 7 in the same direction as the burner 6, it is ensured that the opposite corners 9 are heated equally, so that the temperature obtained may be even more uniform. In this case, the additional burners 6, 7 may be directed exactly tangentially.

As a final alternative, it is also possible to arrange a number of burners parallel to one another in one plane, which coincides with the plane of the sealing edge. With such an arrangement, in accordance with the invention, the outer burners can be utilized to provide heat only for the corner areas of the cone and window 10. Such an arrangement is shown diagrammatically in Fig. 2. The outer burners comprising burners 6 and 7 cover only the corner areas of the cone and window, while the inner burners, comprising burner 3 and the burners diagrammatically designated by each of the arrows 8, provide the heat for the rectangular edges 4, 5.

Owing to the invention, a machine used for sealing circular windows may be rendered suitable for sealing rectangular windows in a very simple manner, i. e. by simply adding one or two burners to each step. The invention may also be utilized for sealing a glass window to a metal cone.

While we have thus described our invention with specific examples and embodiments thereof, other modifications will be readily apparent to those skilled in the art without departing from the spirit and scope of the invention, as defined in the appended claims.

What we claim is:

1. A method of sealing a rectangular glass window to a correspondingly shaped end of a cone of a cathode-ray tube, which comprises the steps of positioning said window so that its outer edge abuts the corresponding outer edge of said cone, rotating said tube and said window around a central axis while maintaining the abutting relationship therebetween, applying heat to the abutting portions of said rotating tube and window so that the abutting portions are substantially heated throughout the length thereof, applying heat substantially in the direction of a tangent to and lying in the plane of the circle of rotation of the corners of said window at which only said corners and adjacent portions of the window and cone are heated, and continuing to heat said abutting portions until they melt uniformly together to form a unitary body.

2. A method of sealing a rectangular glass window to a correspondingly shaped end of a cone of a cathode-ray tube, which comprises the steps of positioning said window so that its outer edge abuts the corresponding outer edge of said cone, rotating said tube and said window around a central axis while maintaining the abutting relationship therebetween, applying heat to the abutting portions of said rotating tube and window so that the abutting portions are substantially heated throughout the length thereof, applying heat in the direction of a tangent to and lying in the plane of the circle of rotation of the corners of said window so that only said corners and adjacent portions of the window and cone are heated, and continuing to heat said abutting portions until they melt uniformly together to form a unitary body.

3. A method of sealing a rectangular glass window having longer and shorter sides to a correspondingly shaped end of a cone of a cathode-ray tube, which comprises the steps of positioning said window so that its outer edge abuts the corresponding outer edge of said cone, rotating said tube and said window around a central axis while maintaining the abutting relationship therebetween, providing a plurality of burners for applying heat to the abutting portions of said rotating tube and window, applying heat from the flame of at least one of said burners at the abutting portions of said rotating tube and window so that the abutting portions are substantially heated throughout the length thereof, said burner being adjusted so that the short rectangle sides of said window and cone pass exactly through the hottest zone of the flames thereof and so that the long rectangle sides pass exactly outside the hottest zone of the flames thereof, applying heat from the flame of at least another of said burners substantially in the direction of a tangent to and lying in the plane of the circle of rotation of the corners of said window so that only said corners and adjacent portions of the window and cone are heated, and continuing to heat said abutting portions until they melt uniformly together to form a unitary body.

4. A method of sealing a rectangular glass window having longer and shorter sides to a correspondingly shaped end of a cone of a cathode-ray tube, which comprises the steps of positioning said window so that its outer edge abuts the corresponding outer edge of said cone, rotating said tube and said window around a central axis while maintaining the abutting relationship therebetween, providing a plurality of burners arranged in a row in the plane of the abutting portions of said rotating tube and window for applying heat to said abutting portions applying heat from the flame of at least one of said burners at the abutting portions of said rotating tube and window so that the abutting portions are substantially heated throughout the length thereof, said burner being adjusted so that the short rectangle sides of said window and cone pass exactly through the hottest zone of the flames thereof and so that the long rectangle sides pass exactly outside the hottest zone of the flames thereof, applying heat from the flame of at least another of said burners substantially in the direction of a tangent to and lying in the plane of the circle of rotation of the corners of said window so that only said corners and adjacent portions of the window and cone are heated, and continuing to heat said abutting portions until they melt uniformly together to form a unitary body.

References Cited in the file of this patent

UNITED STATES PATENTS

| Number | Name | Date |
|---|---|---|
| 2,573,266 | Melcher et al. | Oct. 30, 1951 |
| 2,580,450 | Melcher et al. | Jan. 1, 1952 |

FOREIGN PATENTS

| Number | Country | Date |
|---|---|---|
| 536,858 | Great Britain | May 29, 1941 |